(No Model.)  
2 Sheets—Sheet 1.
D. C. MATTESON.
HARVESTER.
No. 333,533. Patented Jan. 5, 1886.
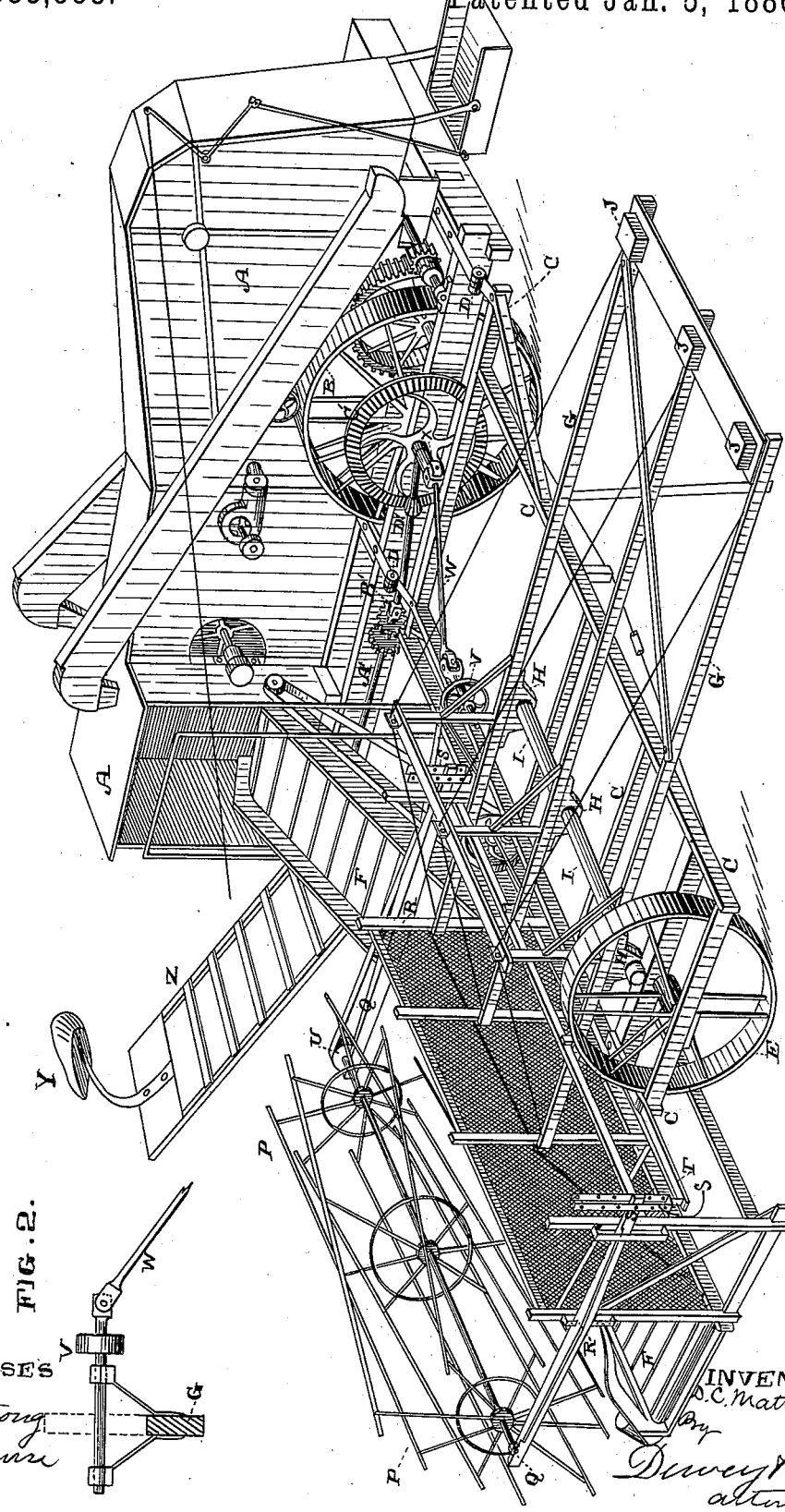
FIG. 1.
FIG. 2.
WITNESSES  
Geo. H. Strong  
INVENTOR  
D. C. Matteson  
by  
Dewey & Co.  
Attorneys (No Model.)  2 Sheets—Sheet 2.
D. C. MATTESON.
HARVESTER.
No. 333,533. Patented Jan. 5, 1886.
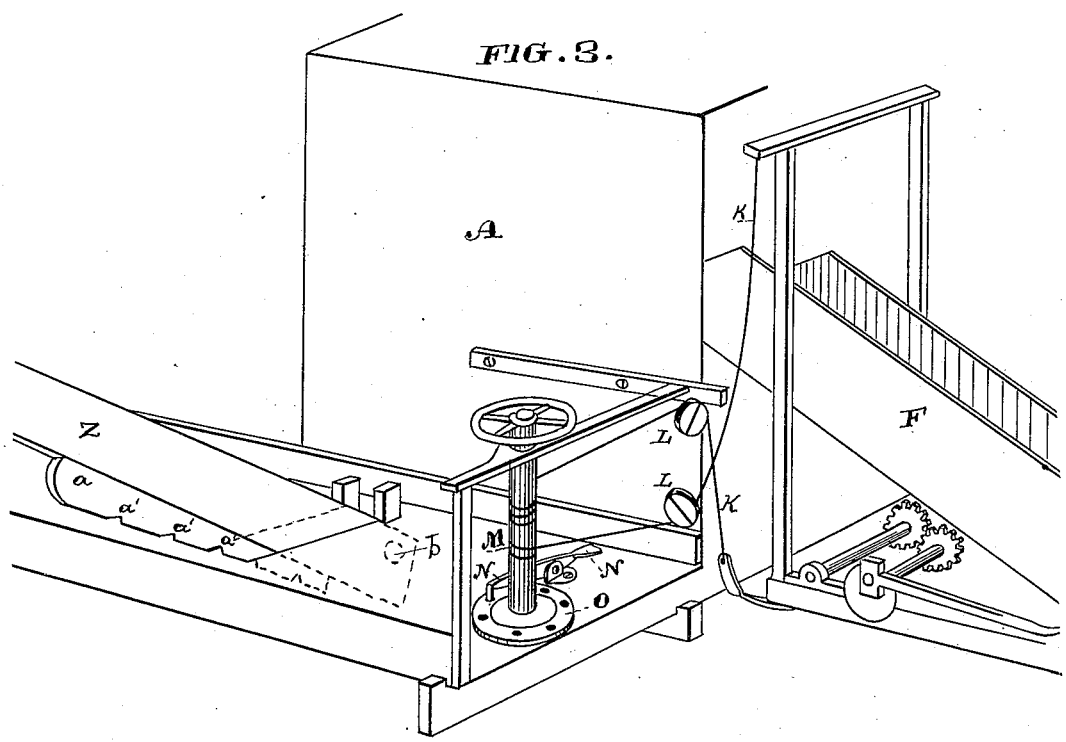
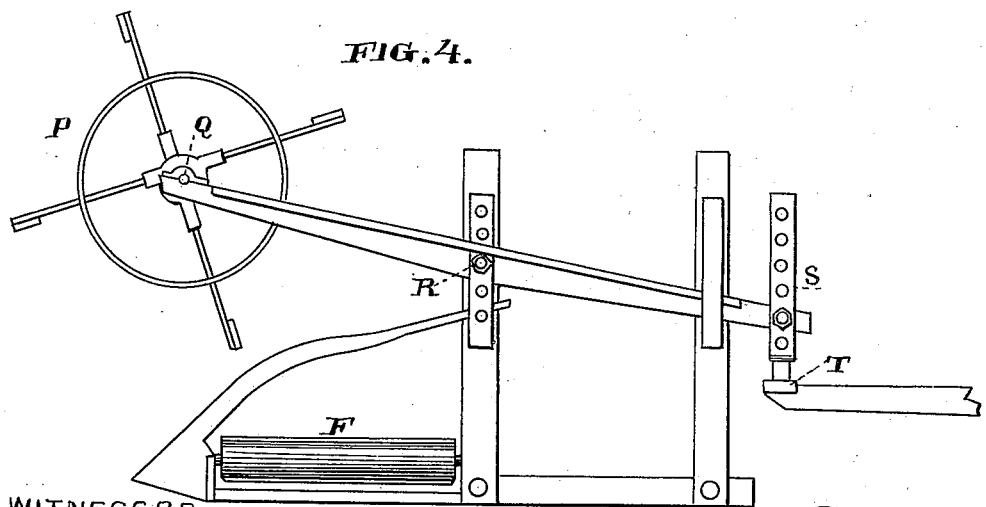
WITNESSES
Geo. H. Strong.
J. T. Nourse
INVENTOR
D. C. Matteson
By Dewey & Co.
Attorneys

UNITED STATES PATENT OFFICE.

DON C. MATTESON, OF STOCKTON, CALIFORNIA.

HARVESTER.

SPECIFICATION forming part of Letters Patent No. 333,533, dated January 5, 1886.

Application filed January 15, 1885. Serial No. 153,028. (No model.)

*To all whom it may concern:*

Be it known that I, DON C. MATTESON, of Stockton, county of San Joaquin, State of California, have invented an Improvement in Harvesters; and I hereby declare the following to be a full, clear, and exact description of the same.

My invention relates to certain improvements in harvesters, and to the class in which the heading, thrashing, and separating and cleaning mechanism are united together by a frame or frames, so that they may be propelled about the field to cut, thrash, and clean the grain as they go; and it consists of a header-frame adjustably connected with a secondary frame, which in turn is hinged to the side of the thrasher, and in certain improvements of mechanism for raising and lowering the header, and in certain details of construction, all of which will be more fully explained by reference to the accompanying drawings, in which—

Figure 1, Sheet 1, is a perspective view of my combined harvester. Fig. 2, Sheet 1, is an enlarged view of the reel counter-shaft, with its supporting-boxes and tumbling-rod. Fig. 3, Sheet 2, is an enlarged perspective view of the mechanism for raising and lowering the cutter-bar. Fig. 4 is an elevation of the end of the header-frame, showing the reel-adjusting devices.

A is the body or casing of the thrasher and separator, and B the wheels by which it is supported, and by the rotation of which the interior mechanism is driven as the machine moves about the field. To one side of this frame is hinged the wheel-frame C of the heading portion of the apparatus by hinges, (shown at D,) which allow its outer end to move up and down at right angles with the separator, as the outer bearing-wheel, C, passes over irregularities in the ground. The cutting or heading apparatus at the front end, and the draper or carrying belt F, by which the cut grain is carried up and delivered to the thrasher-cylinder, are supported upon the front end of the supplemental frame G, as shown.

The sickle is reciprocated across the front of the header-frame by a crank or eccentric upon a shaft, A', which extends to the front between the frames of the header and the separator, and has a universal joint at B'. The inner end of this shaft is journaled in a step or box, which is itself fitted to allow the end of the main shaft or axle to turn within it outside of the bevel gear-wheel C'. A bevel-pinion, D', is keyed to the shaft A', and is engaged and driven by the bevel-gear C', and as the journals I, hereinafter described, are in line with the main shaft or axle, it will be seen that the oscillations of the header-frame in its adjustment will not derange the gearing.

The frame G has boxes near its center, into which the round journals of a shaft, I, pass, and upon which the frame is allowed to oscillate or tilt vertically. The shaft I is supported transversely upon the frame-work C, and in a plane nearly or quite above the axis of the bearing-wheel and also in line with the main-wheel axle. This allows the header portion which projects to the front to be suitably counterbalanced by weights upon the rear end, as shown at J, and it is very easily tilted by means of ropes K, connected with it and passing over pulleys L, and thence around a windlass, M, as shown in Fig. 3.

In order to give the operator free use of both hands for the purpose of turning the windlass when necessary, I employ a pawl, N, which is pivoted upon a platform, so that the foot of the operator may be used to move it and disengage it from the perforated rack or holding plate O, which is fixed to the lower part of the vertical windlass, as shown. The reel P has its shaft journaled upon the outer ends of the timbers Q. These timbers are pivoted to the uprights of the header-frame at the points R, and their rear ends are pivoted to vertical bars S. These bars project upward from horizontal arms T, which are fixed to the wheel-frame C of the header, so that through them the rear ends of the lever-arms Q are held stationary. The effect of this will be as follows: When the front end of the header-frame is depressed, so that short grain may be cut, the rear end of these reel-supporting arms will be held stationary by their support from the wheel-frame C, but the journal-point R will be depressed, and this will carry the front ends of the arms Q and the reel downward, so that they will act upon the short grain when the cutter-bar is depressed. When the front end of the header-frame and the cutter-bar are elevated to cut high grain, the reverse action will take place, and the reel will be raised, thus rendering the adjustment of the reel automatic.

The reel is driven by a belt passing over the pulleys U upon one end of its shaft, and over a pulley, V, upon a short shaft, which is journaled, as shown in Fig. 2, upon the header-frame G.

In order to avoid the use of any more pulleys or belts, I connect the tumbling-rod W with the end of this pulley-shaft, and also the end of the main driving-shaft. (Shown in Fig. 1.) The seat Y is supported from the upper end of a frame, Z, so that it projects forward from the separator and places the driver above the horses and opposite the cutter-bar of the header-frame, where he can observe the work. The rear end of this frame passes through the front platform, and has its rear end hinged to the main frame beneath at $b$.

$a$ is a wedge having notches, as shown at $a'$, and these notches are fitted to rest upon the front timber of the frame, as shown in Fig. 3. Whenever it is desired to raise or depress the driver's seat, it is done by pushing these wedges in or withdrawing them so that the desired notch $a'$ will rest upon the frame, and as the distance between these points and the hinged point at the rear is small a very little difference in thickness will adjust the seat to the proper height, which in level land may be low, and in rolling land must be high enough so that its frame will not strike the backs of the horses. By this construction the operation of the heading apparatus is greatly improved, and the combined action of the header and the separator is more perfect, as each one accommodates itself to the movement of the other.

Having thus described my invention, what I claim as new, and desire to secure by Letters Patent, is—

1. In a combined traveling header and thrasher, a separator frame or case supported by bearing-wheels, a header-frame extending at right angles from the side of the separator, to which one end is hinged, while the other is supported by a bearing-wheel, and a supplemental frame supporting upon its front end the cutter-bar, carrying belt or draper, and reel, the said frame being pivoted at its center upon the shaft I of the main header-frame C, and extending at the rear beyond the said frame C, and having counterbalance-weights thereon, substantially as described.

2. The main header-frame, having one end hinged to the side of the separator, the other supported by a bearing-wheel, a secondary frame fulcrumed or journaled upon the main frame, the cutter-bar, carrying belt or draper, and reel supported from the front of the secondary frame, said frame counterbalanced at the rear, in combination with ropes or chains by which the frame is tilted about its journals and raised or lowered, the drum or windlass by which the ropes are operated, and a foot-pawl, K, and a holding-plate, O, substantially as herein described.

3. The seat Y, supported upon the projecting frame, which has the rear end hinged to the front of the separator, in combination with the notched adjusting-wedge $a$, substantially as herein described.

4. In a traveling header and thrasher, a separator frame or case supported upon bearing-wheels, and a bevel gear-wheel upon the wheel-shaft, by which the sickle is driven, a header-frame extending at right angles from the side of the separator, to which the inner end is hinged, while the outer end is supported by a bearing-wheel, in combination with a supplemental frame hinged or journaled so as to tilt upon the main frame, and a jointed shaft or tumbling-rod with a crank upon one end to drive the sickle, the other end turning in a box journaled upon the main axle and having a bevel-pinion which engages and is driven by the bevel-gear, substantially as herein described.

In witness whereof I have hereunto set my hand.

DON C. MATTESON.

Witnesses:
 WILLARD T. JONES,
 A. F. HILLMAN.